United States Patent [19]

Romano

[11] Patent Number: 4,819,497
[45] Date of Patent: Apr. 11, 1989

[54] FAST OPENING ARRANGEMENT FOR SHOES OF BICYCLE BRAKES

[75] Inventor: Antonio Romano, Padova, Italy

[73] Assignee: Campagnolo S.P.A., Vicenza, Italy

[21] Appl. No.: 28,339

[22] Filed: Mar. 23, 1987

[30] Foreign Application Priority Data

Mar. 25, 1986 [IT] Italy .............................. 21349/86[U]

[51] Int. Cl.[4] .......................... G05G 11/00; F16C 1/10
[52] U.S. Cl. .................................... 74/489; 74/502.2; 74/526
[58] Field of Search ............. 74/489, 537, 488, 501 B, 74/501 R, 526, 527; 188/2 D, 24.18, 24.19, 24.22

[56] References Cited

U.S. PATENT DOCUMENTS

| 3,176,536 | 4/1965 | Altenburger | 74/489 |
|---|---|---|---|
| 3,546,960 | 12/1970 | Masuda | 74/489 |
| 3,719,104 | 3/1973 | Dian | 74/489 |
| 4,005,613 | 2/1977 | Kaufmann | 74/489 |

FOREIGN PATENT DOCUMENTS

| 1096784 | 1/1961 | Fed. Rep. of Germany | 74/489 |
|---|---|---|---|
| 1296037 | 5/1969 | Fed. Rep. of Germany | 74/489 |
| 1183515 | 7/1959 | France | 74/489 |
| 856796 | 12/1960 | United Kingdom | 74/526 |

Primary Examiner—Gary L. Smith
Assistant Examiner—Rodney M. Lindsey
Attorney, Agent, or Firm—Young & Thompson

[57] ABSTRACT

A fast opening arrangement for shoes of bicycle brakes—of the type wherein control is obtained, by cable, through a control lever pivotally mounted on a body fixed to the bicycle handle bar—comprises a cylinder inserted across the control lever and axially moving through the same between two positions, which alternatively rest with their lateral surface against one or the other of the two sidewalls of the body on which said lever is pivotally mounted. These walls project to different extents and are cam profiled. In one of the two positions, the brake shoes are close to but spaced from the tire for normal braking; but in the other position, the shoes are spaced far enough apart to permit the wheel to be removed from between them.

4 Claims, 2 Drawing Sheets

FAST OPENING ARRANGEMENT FOR SHOES OF BICYCLE BRAKES

BACKGROUND OF THE INVENTION

It is known that, in sports and competition bicycles using the so-called shoe brakes, the distance between the two brake shoes, which has to be very small in order to obtain a prompt and efficient braking, is normally less than the largest transversal dimension of the tire, and this prevents an easy wheel removal.

On the other hand, it is highly desirable in all the sports bicycles, and even essential in competition bicycles, for the wheels to be removed in an extremely easy and fast manner. Various expedients have thus been worked out in order to obtain a quick opening of the brake shoes allowing, in case of need, to remove the wheel without meeting any obstacles on the part of the brakes.

SUMMARY OF THE INVENTION

The present invention concerns a fast opening arrangement for brake shoes—which distinguishes itself by its particular structural simplicity, combined with comfort, efficiency and the possibility of prompt and easy wheel removal—according to which one acts by varying the position of the brake control cable, instead of the rest position of the sheath. Said arrangement, of the type wherein control is obtained, by cable, through a control lever pivotally mounted on a body fixed to the bicycle handle bar, is substantially characterized in that means inserted across the control lever and axially moving through the same between two positions, alternatively rest with their lateral surface against one or the other of the two sidewalls of the body on which said lever is pivotally mounted, said sidewalls projecting to different extents and being cam profiled. Appropriately, said means are firmly held in said two positions by way of spring release devices.

BRIEF DESCRIPTION OF THE DRAWINGS

The invention is now described in further detail, with reference to a preferred embodiment thereof, illustrated by the accompanying drawings, in which.

DESCRIPTION OF THE PREFERRED EMBODIMENT

With reference to the drawings, a control lever 1 for a bicycle brake is pivotally mounted on the bicycle handle br 2 by way of a body 3 fixed on said bar by means of a clip 4. The lever 1 is pivoted on the body 3 at 5 and it comprises, at 6, a nipple 7 for connection on the shoe brake control cable (not shown), this latter being conventionally guided at 8 through the body 3.

Figure 1:
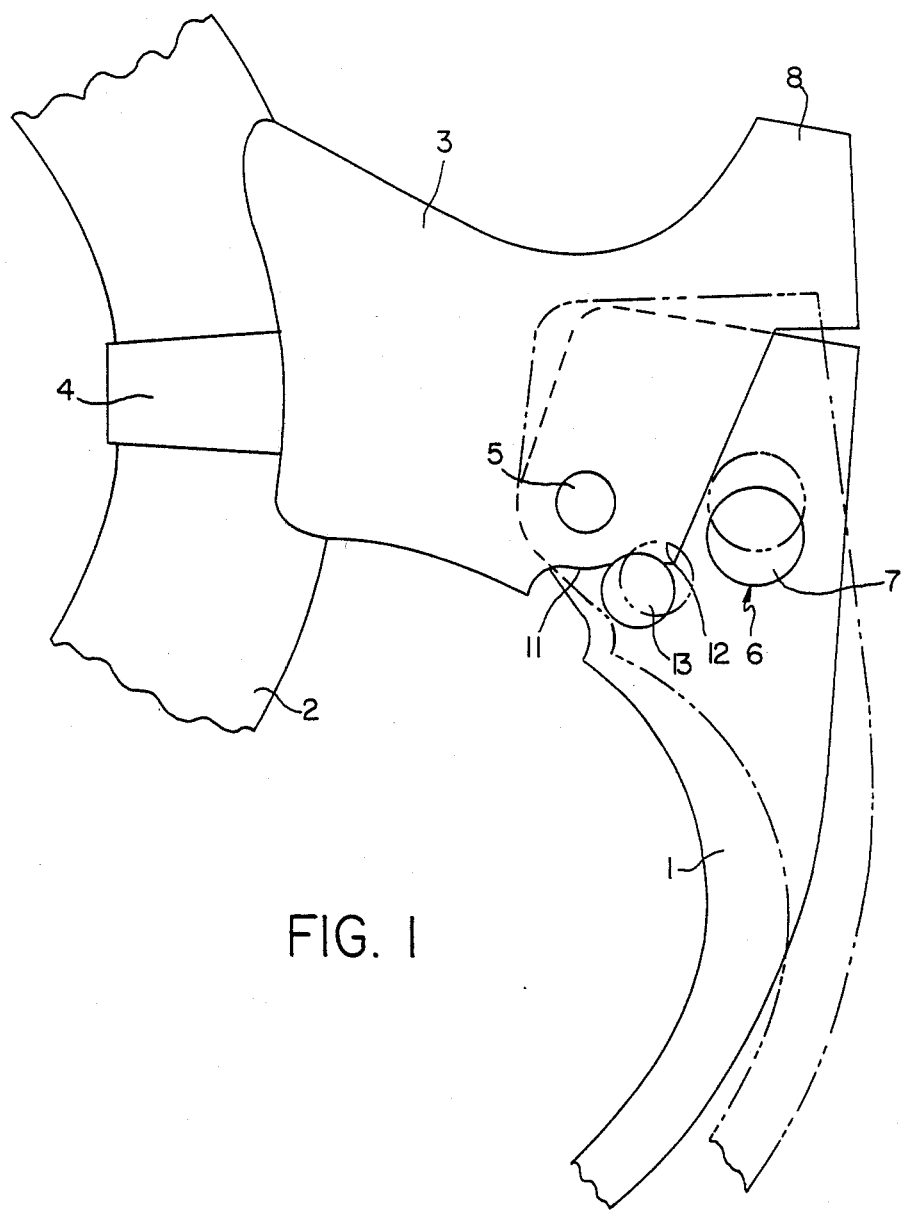
FIG. 1 is a lateral view of a control lever for bicycle brakes, mounted on its pivoting body, incorporating the arrangement according to the invention.

According to the invention, the two sidewalls 9 and 10 of the body 3 are formed projecting to different extents (FIGS. 2 and 3) and end with recesses or cam profiles 11 and 12 (FIG. 1), while a cylinder 13 is inserted across the lever 1 and is axially movable therein, so as to take up two different positions in which it alternatively rests, with its outer surface, against one or the other of the two cam profiles 11 and 12 of the body 3.

Figure 2:
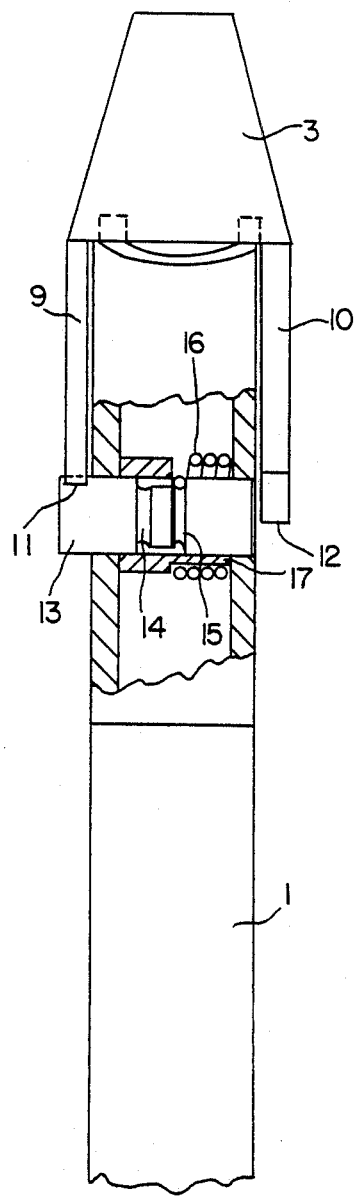
FIG. 2 is a partially sectioned front view of the control lever and pivoting body of FIG. 1, in a first position of use.
Figure 3:
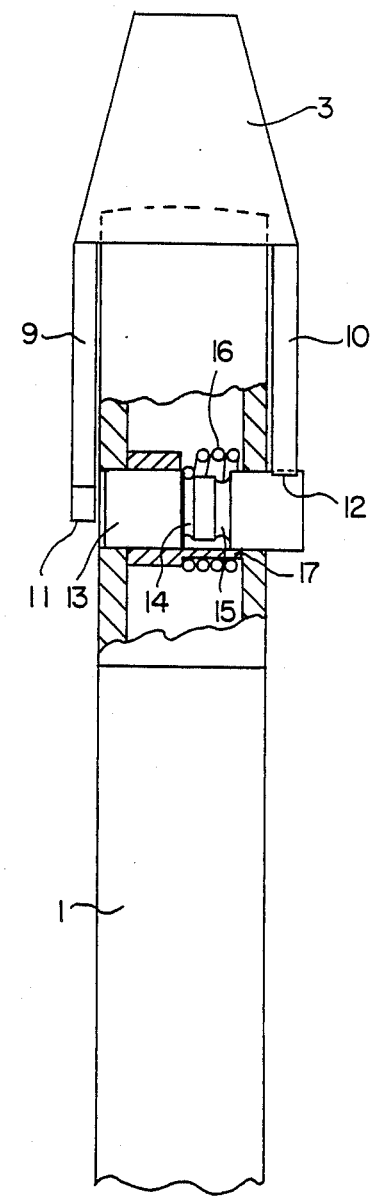
FIG. 3 is a front view similar to that of FIG. 2, but showing the second position of use of the arrangement according to the invention.

The cylinder 13 comprises two circumferential grooves 14 and 15, with which is adapted to cooperate a spiral spring 16 wound around a sleeve 17 housing the cylinder 13. The arrangement is such that, the cylinder 13 engages the spring 16 with its groove 14, when it takes up the position of rest against the cam profile 12 leaving the cam profile 11 (FIG. 3), and with its groove 15, when it takes up the position of rest against the cam profile 11 leaving the cam profile 12 (FIG. 2). Thus, the spring 16 guarantees, on the one hand, the steadiness of the two working positions of the cylinder 13 and, on the other hand, their precision. At the same time, this arrangement guarantees the easy passage from one position to the other, by simply overcoming the elastic retention of the spring 16 through the axial pressure on the cylinder 13.

It is quite evident from the drawings that the position of FIG. 2 refers to the normal working conditions of the brake, with shoes drawn close to but spaced from the rim, in rest conditions, and shoes drawn close and tightened against the rim being braked, in working conditions. While the position of FIG. 3 refers to the conditions of easy wheel removal, which the arrangement according to the invention intends to fulfill: in fact, when the cylinder 13 moves against the cam profile 12, which is less projecting than the profile 11, the lever 1 is allowed to oscillate around the pivot 5 beyond the normal rest position (shown in full lines in FIG. 1) and as far as the position shown in dashed lines in the same figure, thereby leaving the control cable free to loosen under the action of the springs of the brake shoes, which shoes thus move apart sufficiently to allow the exit of the wheel when having to remove the same.

The passage of the cylinder 13 from one position to the other is easy and prompt, and can be facilitated by suitably operating the lever 1. The precision of said positions guarantees an efficient and reliable behavior of the arrangement according to the invention, the simplicity of which need not be underlined.

I claim:

1. Fast opening arrangement for shoes of bicycle brakes, wherein control is obtained, by cable, through a control lever pivotally mounted on a body fixed to the bicycle handle bar, comprising means inserted across the control lever and axially movable through the said control lever between two positions in which said means alternatively rests with a lateral surface against one or the other of two sidewalls of the body on which said lever is pivotally mounted, said sidewalls projecting to different extents so that for normal braking said means rest against one said sidewall which is so positioned that said shoes are close to but spaced from a bicycle tire and for wheel removal said means rest against the other said sidewall which is so positioned that said shoes are spaced further from the bicycle tire.

2. Arrangement as in claim 1, wherein said means consist of a cylinder, firmly held in one or the other of said two positions by way of spring release means.

3. Arrangement as in claim 1, wherein said spring release means comprises a spiral spring, wound around a sleeve housing said cylinder and adapted to cooperate with one or the other of two circumferential grooves provided in the cylinder.

4. Arrangement as in claim 1, in which each said sidewall has a recess in which said means is disposed in the associated said position.

* * * * *

UNITED STATES PATENT AND TRADEMARK OFFICE
CERTIFICATE OF CORRECTION

PATENT NO. : 4,819,497

DATED : April 11, 1989

INVENTOR(S) : Antonio Romano

It is certified that error appears in the above-identified patent and that said Letters Patent is hereby corrected as shown below:

Column 2, line 60, change "claim 1," to --claim 2,--.

Signed and Sealed this

Tenth Day of April, 1990

Attest:

HARRY F. MANBECK, JR.

*Attesting Officer*      *Commissioner of Patents and Trademarks*